United States Patent [19]
Deloy et al.

[11] Patent Number: 5,959,852
[45] Date of Patent: Sep. 28, 1999

[54] UNITY POWER FACTOR POWER SUPPLY FOR USE WITH VARIABLE FREQUENCY POWER SOURCES

[75] Inventors: Jeff J. Deloy, Central City; Walter H. Hewett, Cedar Rapids, both of Iowa

[73] Assignee: Rockwell International, Costa Mesa, Calif.

[21] Appl. No.: 08/994,952

[22] Filed: Dec. 19, 1997

[51] Int. Cl.[6] .................... G05F 1/10; G05F 1/40; H02M 1/12; H02M 3/24
[52] U.S. Cl. .................... 363/45; 363/89; 323/222; 323/288; 323/283
[58] Field of Search ................ 363/45, 89; 323/222, 323/282, 283, 284, 285, 288

[56] References Cited

U.S. PATENT DOCUMENTS

| | | | |
|---|---|---|---|
| 4,356,440 | 10/1982 | Curtiss et al. | 323/210 |
| 4,677,366 | 6/1987 | Wilkinson et al. | 323/222 |
| 4,940,929 | 7/1990 | Williams | 323/285 |
| 5,006,975 | 4/1991 | Neufeld | 363/89 |
| 5,089,978 | 2/1992 | Lipner et al. | 364/551.01 |
| 5,144,222 | 9/1992 | Herbert | 323/282 |
| 5,347,209 | 9/1994 | Payne et al. | 323/222 |
| 5,572,416 | 11/1996 | Jacobs et al. | 363/89 |
| 5,602,465 | 2/1997 | Clemente | 323/285 |

*Primary Examiner*—Peter S. Wong
*Assistant Examiner*—Bao Q. Vu
*Attorney, Agent, or Firm*—Kyle Eppele; James P. O'Shaughnessy

[57] ABSTRACT

A unity power factor power supply includes a boost converter. The boost converter draws current in phase with the input voltage by operating as a current regulator having a current reference control signal which tracks the line voltage waveform. A sample and hold technique is utilized to accommodate single cycle step input compensation and to reduce harmonic distortion over a wide input frequency range.

15 Claims, 2 Drawing Sheets

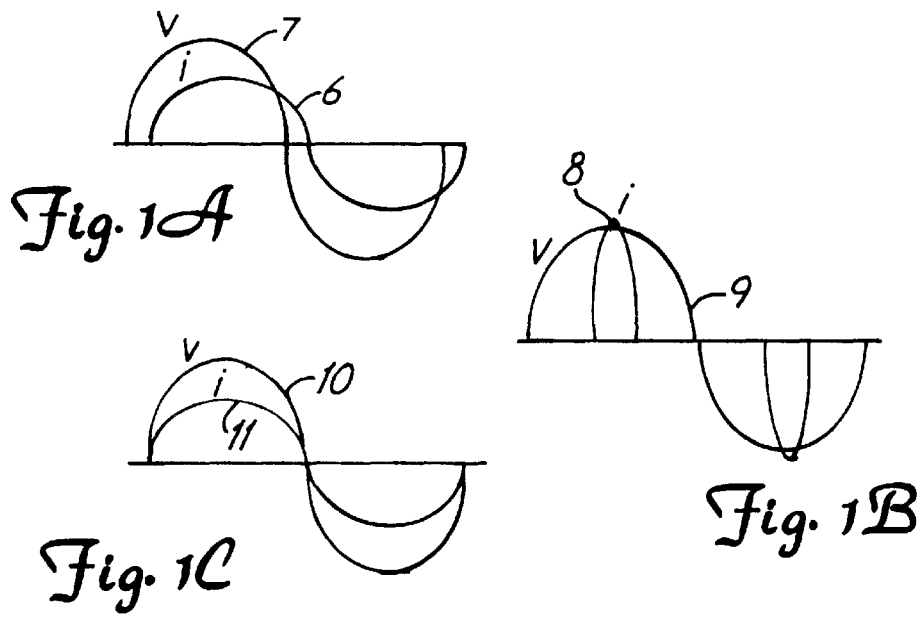
Fig. 1A
Fig. 1B
Fig. 1C
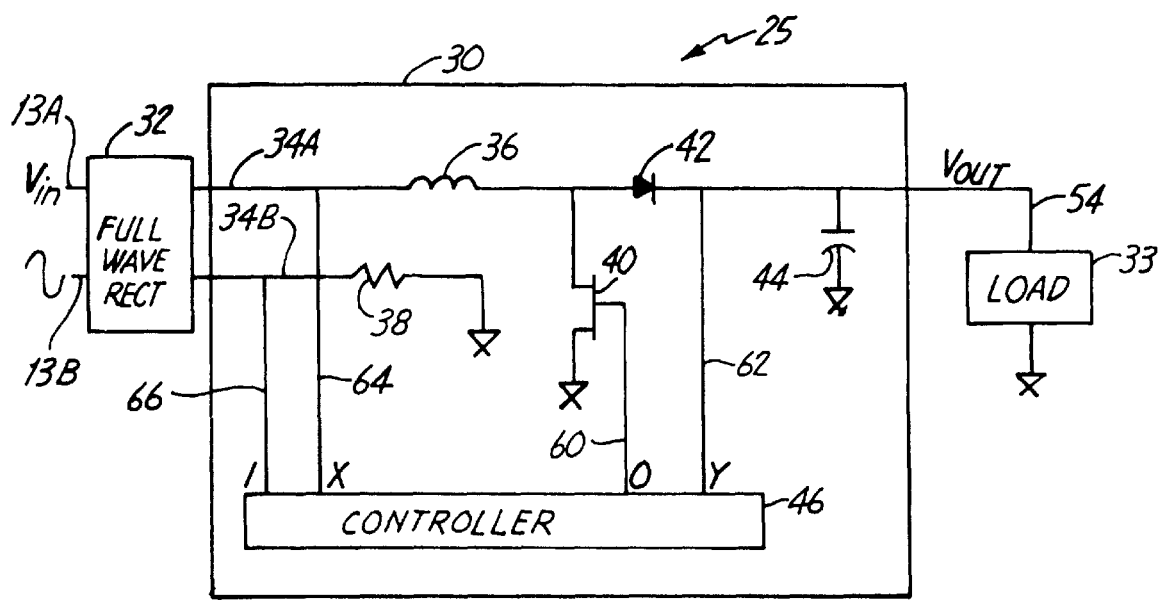
Fig. 2

UNITY POWER FACTOR POWER SUPPLY FOR USE WITH VARIABLE FREQUENCY POWER SOURCES

CROSS REFERENCE TO RELATED PATENT APPLICATION

The present application is related to U.S. application Ser. No. 08/693,762, filed on Aug. 8, 1997, now U.S. Pat. No. 5,689,176 by Deloy and assigned to the assignee of the present invention.

FIELD OF THE INVENTION

The present invention relates generally to power supply circuits which are coupled to alternating current (AC) power sources. More particularly, the present invention relates to a boost converter which supplies power at essentially a unity power factor over a wide range of AC power source frequencies and voltage level inputs.

BACKGROUND OF THE INVENTION

Various electronic systems convert alternating current (AC) power to direct current (DC) power in a multitude of applications. The AC power can be provided at numerous frequencies and at many voltage levels by a myriad of AC power sources. For example, an aircraft electronic system can be powered by a 120 volt (V) AC, a 60 Hz ground-based power supply, a 120 VAC, a 400 Hz aircraft engine alternator, or other AC power sources.

The 120 VAC, 400 Hz power is typically derived from alternators which are rotated by the engines of the aircraft. Accordingly, the frequency of the power provided by the alternators is often dependent on engine speed. In most conventional aircraft electrical systems, the alternators are coupled to a rectifier through constant frequency generators which ensure that the load is provided AC power at the same frequency from the alternators despite the operating speed of airplane engines.

Constant frequency generators are large electromechanical devices which can produce large amounts of heat. The large amounts of heat must often be dissipated by sizable dissipation devices, such as, oil cooling devices. Dissipating heat from constant frequency generators is particularly problematic because the constant frequency generators often must remove the most heat when the engine is running at its fastest speed, which is also when the engine generates maximum heat. For example, at take-off, the engine is often generating large amounts of heat as it is operated at maximum speed. The maximum speed associated with the engine also causes the alternators to generate maximum power, a portion of which must be dissipated as heat by the constant frequency generators.

The AC power from the constant frequency generator is typically converted to DC power and reconverted to AC power by switched converters, by power inverters, or is otherwise applied to an electrical load. Such well-known circuits usually include a large storage capacitor connected across a rectifier bridge. The large storage capacitor can cause the input current associated with the AC power to become highly non-sinusoidal. As shown in FIG. 1A, the non-sinusoidal nature of input current signal 6 results in a poor effective power factor for the AC power associated with current signal 6 and voltage signal 7. The poor power factor, which is manifested by current signal 6 lagging considerably behind voltage signal 7, requires the AC power source to provide a larger amount of power for a given power output.

With reference to FIG. 1B, the non-sinusoidal nature of current from the AC power source also can create high harmonic distortions. The high harmonic distortion can result in high peak currents, such as, a current signal 8 being drawn from the AC power source at a harmonic frequency. Relatively high current, such as, current signal 8, is drawn near peaks of a voltage signal 9 from the AC power source because conventional switched converters generally operate as a capacitive load for the received voltage from the AC power source. As a result, substantially zero current for the remainder of the cycle of current signal 8 and voltage signal 9 is drawn. This phenomenon results in a poor power factor and in a large harmonic distortion, which are manifested by drawing a larger root mean square (RMS) current from the power source when compared to a purely resistive load. For example, a conventional switched power supply can draw about 1.5 times the RMS current from the AC power source for a given power output as compared with a purely resistive load.

Commercially available products can be coupled between the AC power source and the switched power supply to reduce the power factor/harmonic distortion problems. Such products can cause a voltage signal 10 to be in phase with a current signal 11, thereby achieving an almost unity power factor, as shown in FIG. 1C. One such product, a boost converter, is disclosed in U.S. Pat. No. 4,677,366, issued to Wilkinson et al. on Jun. 30, 1997.

U.S. Pat. No. 4,677,366 describes a switched power supply which is well-known in the art. The switched power supply includes a boost converter coupled between a diode rectifier bridge and a storage capacitor of the switched power supply. The storage capacitor can be considered as part of the switched converter or as part of the boost converter. The boost converter is incorporated into the power supply because it draws a relatively smooth current from the AC power source (e.g., the line), and it permits the voltage on the storage capacitor to be higher than the voltage produced by the diode rectifier bridge, thereby providing more efficient energy storage.

The boost converter includes an inductance coil, a transistor, a diode, and a capacitor. The inductance coil is coupled in series with the diode. The capacitor is coupled between the cathode of the diode and ground, and the transistor is coupled between the anode of the diode and ground (between the inductor and the diode).

The boost converter is configured to draw a sinusoidal current by operating as a current regulator with a current reference control signal set to track the voltage from the power source. The current reference control signal controls the voltage across the capacitor. The voltage across the capacitor is regulated by controlling the magnitude of the current through the boost converter by modulating the transistor. In this way, the boost converter allows the switched converter to achieve a unity power factor for a known, constant AC power input signal.

Nonetheless, commercially available products, such as, the switched power supply including the boost converter disclosed in U.S. Pat. No. 4,677,366, exhibit poor input step response performance over wide input frequency ranges, such as, the operating ranges of 50 Hz–1000 Hz associated with aircraft AC power supplies. For example, an aircraft power source can change from 120 VAC, 60 Hz when ground-based, to 120 VAC, 400 Hz when flying. Additionally, aircraft power supplies can be variable frequency power sources which develop power at voltage levels and at frequencies dependent on engine speeds.

Therefore, conventional switched power supplies including boost converters cannot adequately handle variable AC power, especially in aircraft applications.

Thus, there is a need for a power supply which has optimized power factor and harmonic correction operation. Further still, there is a need for a power supply which is operational over a large frequency range. Even further still, there is a need for an aircraft power supply which does not require a constant frequency generator.

SUMMARY OF THE INVENTION

The present invention relates to a power factor controller for a switched power supply including a pulse width modulation control input. The switched power supply is operational with input power at variable frequencies. The power factor controller includes a sample and hold circuit and a control circuit. The sample and hold circuit is coupled to the switched power supply to receive an electrical parameter and to provide a sampled parameter. The control circuit has a control output coupled to the pulse width modulation control input. The control circuit is also coupled to the sample and hold circuit. The control circuit generates the pulse width modulation signal in response to the sampled parameter.

The present invention further relates to a boost converter coupled to the rectifier output. The boost converter includes an inductor coupled to the rectifier output, a switch coupled to the inductor, a sample and hold circuit coupled to rectifier output, and a control circuit having a sense input coupled to the sense output. The switch has a control input. The sample and hold circuit provides a sampled signal at a sense output. The control circuit has a sense input coupled to the sense output and a control output coupled to the control input. The control circuit provides a control signal at the control output in response to the sampled signal.

The present invention still further relates to a boost conversion circuit for use with a rectifier circuit coupled to an alternating current power source. The alternating current power source provides a variable frequency power signal in a frequency range. The boost converter includes a semiconductor switch, a sample and hold means for sampling an electrical parameter and for providing a sampled signal, and a control means for providing a control signal. The semiconductor switch has a control input. The control means provides the control signal to the control input in response to the sampled signal. A power factor and step response associated with the rectifier circuit is increased over the frequency range by utilizing the sampled signal.

According to one exemplary aspect of the present invention, a boost converter is usable with a variable frequency AC power source. The boost converter utilizes a sampled average of the input line voltage signal as part of its control scheme. A sample and hold technique samples the average signal to reduce harmonic distortion significantly and yet allow single cycle step response for a wide range of input frequencies.

BRIEF DESCRIPTION OF THE DRAWINGS

Exemplary embodiments of the present invention will be described hereinafter with reference to the accompanying drawings, wherein like numerals denote like elements, and:

FIG. 1A is a voltage and current waveform diagram illustrating a poor power factor;

FIG. 1B is a voltage and current waveform diagram illustrating high peak currents drawn from an AC power source at harmonic frequencies;

FIG. 1C is a voltage and current waveform diagram illustrating an essentially unity power factor;

FIG. 2 is an electrical schematic diagram of a power source including a boost converter in accordance with an exemplary embodiment of the present invention.

DETAILED DESCRIPTION OF EXEMPLARY EMBODIMENTS

Figure 3:
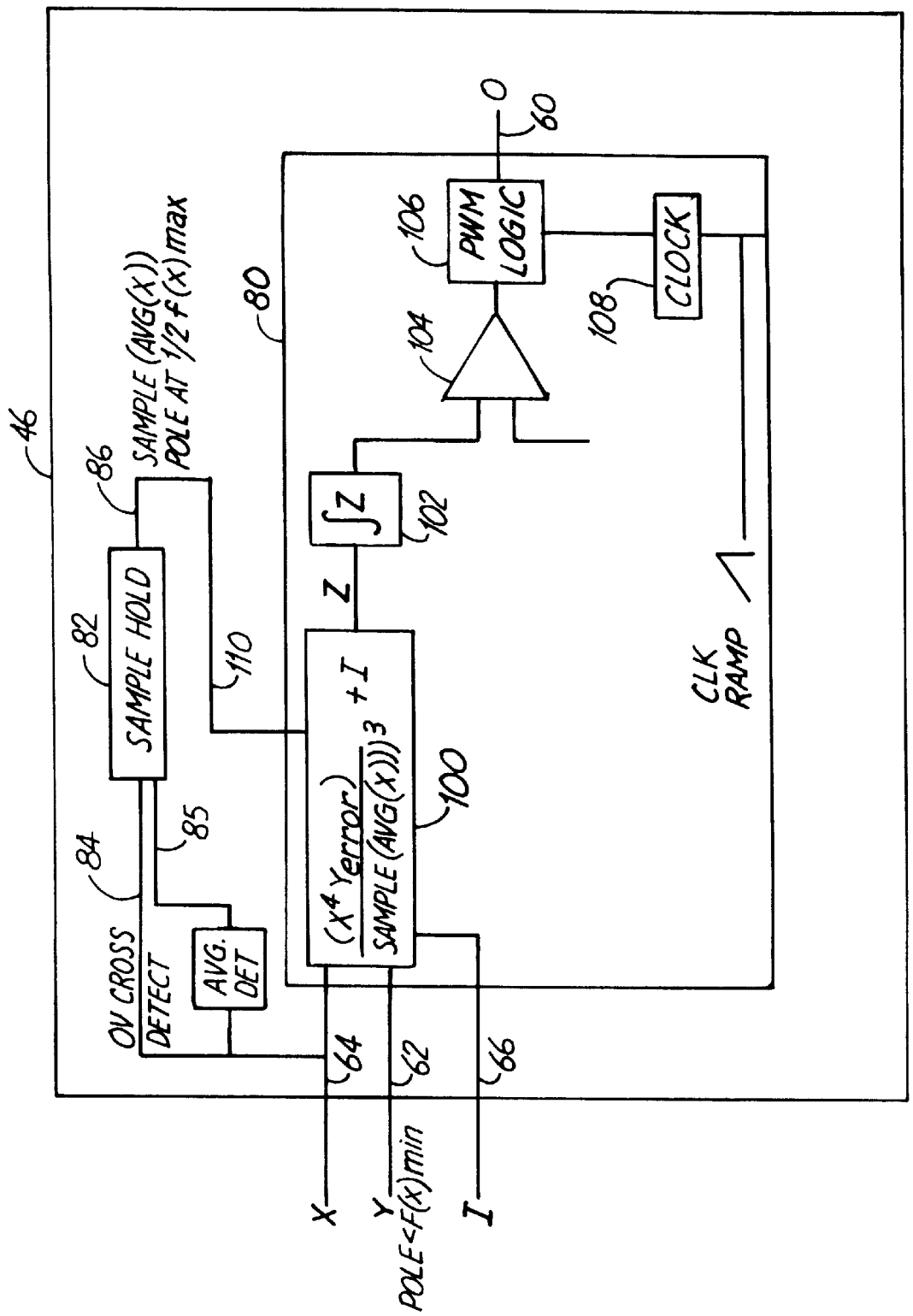
FIG. 3 is a general block diagram of a controller for use with the power supply illustrated in FIG. 2, in accordance with an exemplary embodiment of the present invention.

With reference to FIG. 2, a power system 25 similar to the power circuit disclosed in U.S. Pat. No. 4,677,366 includes alternating current (AC) power source inputs 13A and B, a full wave rectifier 32, and a boost converter 30. Power inputs 13A and B are coupled to a load 33 through rectifier 32 and boost converter 30. Inputs 13A and B can be coupled to an AC power source in an aircraft or to other power sources. Load 33 can be another power supply, such as, a main switched converter or other electrical load.

Boost converter 30 includes inputs 34A and B, an inductor 36, a sense resistor 38, a field effect transistor (FET) 40, a diode 42, a capacitor 44, and d controller 46. Inputs 34A and B are coupled to receive a direct current (DC) power signal from rectifier 32. Inductor 36 is coupled between input 34A and an anode of diode 42. A cathode of diode of 42 is coupled to a capacitor 44 and an output 54. Output 54 is coupled to load 33. Capacitor 44 can be provided as part of load 33.

FET 40 has a drain coupled between inductor 36 and the anode of diode 42, a gate coupled to a control output 60 of control circuit 46 and a source coupled to ground. Input 34B is coupled to ground through resistor 38. Control circuit 46 receives a y-sense signal at an input 62, an x-sense signal at an input 64, and an i-sense signal at an input 66.

The i-sense signal represents the current flow through converter 30. The i-sense is developed from a voltage across resister 38. The y-sense signal represents the voltage at output 54, and the x-sense represents the voltage at input 34A. The voltage at input 34A is related to the voltage provided across inputs 13A and B (e.g., the voltage provided by the AC power source).

Controller 46 preferably utilizes a control scheme which responds to the y-sense, x-sense, and i-sense signals to provide a control signal at output 60. The control signal at output 60 is applied to the gate of FET 40 so that a unity power factor can be achieved by system 25. The control signal is preferably a 200 Kilohertz (KHz) pulse width modulated signal. Controller 46 can utilize a variety of analog or digital components to generate the control signal for appropriately controlling FET 40. For example, controller 46 can be a microcontroller operating a software algorithm or a timer and ramp generator and modulator/comparator.

FET 40 effectively operates as a power switch which controls the current through inductor 36, thereby regulating the current drawn from the AC power source. The duty cycle of the control signal provided to FET 40 is generally adjusted by controller 46 across the half-wave associated with the signal at inputs 24A and 34B. Generally, the duty cycle of the control signal is increased when the voltage across inputs 14A and 14B is low. Conversely, the duty cycle of the control signal is decreased when the voltage across inputs 14A and 14B is high.

With reference to FIG. 3, controller 46 includes a control circuit 80 and a sample and hold circuit 82. Sample and hold circuit 82 has a zero cross detect input 84 coupled to x-sense input 64, an x-sense average input 85 coupled to control circuit 80, and a sample and hold output 86 coupled to control circuit 80. Control circuit 80 includes a calculation circuit 100, an integrator 102, a comparator 104, a pulse width modulation logic circuit 106, and a clock 108.

Calculation circuit 100 receives a sample and hold signal of the average of the x-sense signal at an input 110 from output 86 of sample and hold circuit 82. Circuit 100 also receives the y-sense signal, the x-sense signal, and the i-sense signal at inputs 62, 64, and 66, respectively. Calculation circuit 100 utilizes a simulated power equation to generate the control signal provided at output 60.

In accordance with an exemplary scheme of the present invention, a Z-factor is determined according to the following equation:

$$[X*Y_{error}/(\text{sample and hold }(AVG(X)))^2]+I;$$

where:
- X=the x-sense signal at input 64;
- $Y_{error}$=an error factor related to the y-sense signal and a reference voltage;
- sample and hold (AVG(X))=the sample and hold average signal at output 86; and
- I=i-sense signal.

The value I is usually a negative value. The Y value can be generated by an integrator/amplifier which compares a voltage related to the y-sense signal to a reference voltage. The Z-factor represents an error associated with the voltage and current within converter 30. The AVG(X) signal is the average of the x-sense signal and is provided to an input 85 of circuit 82 by an average circuit 83. Circuit 82 performs a sample and hold operation on the AVG(X) signal.

The Z-factor is integrated by integrator 102 and provided to comparator 104. Comparator 104 compares the integrated signal to a ramp signal to generate a pulse signal. Comparator 104 provides the signal to PWM logic circuit 106, which generates the control signal at output 60. Clock circuit 108 provides clocking for logic 106. The clocking of circuit 106 is synchronized with the ramp signal.

Sample and hold circuit 82 generates a sample and hold signal of the average of the x-sense signal (e.g., AVG(X)). Circuit 80, sample and hold circuit 82, or average circuit 83 can utilize a resistive and capacitive network to form a one or more pole low-pass filter to generate the AVG(X) signal. Preferably, average circuit 83 generates the average of the x-sense signal at input 64 and provides the average to input 85. The low-pass filter can have a corner frequency which is well below the value of the input frequency associated with the AC power supply coupled to inputs 13A and B. Preferably, the low pass filter is a two pole filter comprised of two resistors and two capacitors.

Sample and hold circuit 82 detects the zero voltage crossing associated with the x-sense signal at input 84 and samples the AVG (X) signal at every zero crossing of the x-sense signal. Therefore, the sample and hold signal is held over each half cycle of the voltage at inputs 13A and B by sample and hold circuit 82. Calculator circuit 100 divides the product of the input voltage (e.g., the x-sense signal) and the integrated error signal of the output voltage (e.g., the y error signal) by the square of the sample and hold signal of the average of the x-sense signal and adds the i-sense signal to the quotient to generate the Z-factor. Alternatively, circuit 100 can utilize the sample and hold signal as opposed to the square of the sample and hold signal in accordance with an alternative control scheme.

Integrator 102 integrates the Z-factor. Preferably, the poles of integrator 102 are set to accommodate the intended minimum frequency at inputs 13A and B. When a low frequency input is present, no harmonic distortion is realized as the sample and hold signal is taken at the zero crossing of the signal at inputs 13A and B (e.g., where current flow is approximately zero). When a high frequency input is present, single cycle compensation is preserved. Therefore, controller 46 utilizes a sample and hold technique to reduce harmonic distortion by holding the average value input constant over each half cycle of the input signal at inputs 13A and B. Single cycle input compensation is achieved because the poles of the averaging filter may be increased to near the intended input maximum frequency. Controller 46 allows system 25 to be operating with a variable frequency input AC power source at inputs 13A and B, while maintaining single cycle compensation over the designated frequency range.

Related U.S. patent application Ser. No. 08/693,762 filed by Deloy on Aug. 8, 1997, now U.S. Pat. No. 5,689,176 discloses a more specific exemplary embodiment of circuit 80 and its entire content is incorporated herein by reference. The information in U.S. patent application Ser. No. 08/693,762 is only provided in an exemplary sense and does not limit the scope of the present invention as defined in the claims.

It is understood that, while the detailed drawings, specific examples, and particular dimensions given describe preferred exemplary embodiments of the present invention, they are for the purpose of illustration only. The method and apparatus of the present invention is not limited to the precise details disclosed. Various changes can be made to the details disclosed without departing from the spirit of the invention defined by the following claims.

What is claimed is:

1. A power factor controller for a switched power supply including a pulse width modulation control input, the switched power supply receiving input power at variable frequencies and providing output power with an optimized power factor, the power factor controller comprising:

a sample and hold circuit coupled to the switched power supply to receive an electrical voltage parameter related to the input power and to provide an averaged sampled parameter; and a control circuit having a control output coupled to the pulse width modulation control input, the control circuit coupled to the sample and hold circuit, the control circuit generating the pulse width modulation signal in response to an integral of a factor, the factor being equal to a current parameter related to the output power plus the electrical voltage parameter multiplied by a voltage error factor related to the output power divided by a square of the averaged sampled parameter.

2. The controller of claim 1, further comprising:

a zero crossing detector coupled to the sample and hold circuit, wherein the sample and hold circuit samples the electrical parameter when the input power crosses a zero voltage level.

3. The controller of claim 2, wherein the electrical parameter represents output voltage of a rectifier circuit.

4. The controller of claim 1, wherein the control circuit includes an integrator, the integrator having poles set to accommodate a minimum input frequency associated with the input power, the integrator integrating the factor.

5. A boost converter coupled to a rectifier output, the boost converter comprising:

a power output;

an inductor coupled to the rectifier output;

a switch coupled to the inductor, the switch having a control input;

a sample and hold circuit coupled to the rectifier output and providing an averaged voltage sampled signal at a sense output; and a control circuit having a sense input coupled to the sense output and a control output coupled to the control input, the control circuit providing a control signal at the control output in response to an integral of a factor, the factor being equal to a current parameter at the power the output, plus a voltage parameter at the rectifier output multiplied by an error factor related to a voltage parameter at the power output divided by a square of the averaged voltage sampled signal.

6. The boost converter of claim 5, wherein the control signal is proportional to the inverse square of the average of the sampled signal.

7. The boost converter of claim 6, wherein the control circuit further includes an integrator and a pulse width modulation logic circuit.

8. The boost converter of claim 5, further comprising:

a zero crossing detector coupled to the sample and hold circuit, wherein the sample and hold circuit samples the rectifier output once per every crossing of a zero voltage level by an input signal to the rectifier circuit.

9. The boost converter of claim 5, wherein the filter has poles up to one-half of a minimum frequency associated with an input frequency of a power signal provided up to the rectifier.

10. The boost converter of claim 7, wherein the control circuit includes an integrator, the integrator having poles set to accommodate a minimum input frequency associated with the input power.

11. A boost conversion circuit for use with a rectifier circuit coupled to an alternating current power source, the alternating current power source providing a variable frequency power signal in a frequency range, the boost converter comprising:

a semiconductor switch having a control input;

a sample and hold means for sampling an average of a voltage electrical parameter and for providing a sampled averaged voltage parameter signal; and a control means for providing a control signal to the control input in response to an integral of a factor, the factor being equal to a current parameter plus the voltage electrical parameter multiplied by a voltage error factor divided by a square of the average of the sampled averaged voltage parameter the sampled signal, whereby a power factor associated with the rectifier circuit is increased over the frequency range by utilizing the sampled signal.

12. The boost converter of claim 11, wherein the control signal is proportional to the inverse square of the sampled signal, or the inverse of the average of the sampled signal.

13. The boost converter of claim 11, further comprising:

a zero crossing detector means for causing the sample and hold means to sample the rectifier output once per every crossing of a zero voltage level by an input signal to the rectifier circuit.

14. The boost converter of claim 11, wherein the control means includes an integrator, the integrator having poles set to accommodate a minimum input frequency associated with the variable frequency power signal.

15. The boost converter of claim 11, wherein the frequency range is between 50 and 1000 Hz.

* * * * *